(12) United States Patent
Steimke et al.

(10) Patent No.: US 7,063,350 B2
(45) Date of Patent: Jun. 20, 2006

(54) DUAL CHAMBER SIDE AIRBAG APPARATUS AND METHOD

(75) Inventors: Daniel L. Steimke, Ogden, UT (US); Brian M. Lighthall, Kaysville, UT (US)

(73) Assignee: Autoliv ASP, Inc., Ogden, UT (US)

(*) Notice: Subject to any disclaimer, the term of this patent is extended or adjusted under 35 U.S.C. 154(b) by 218 days.

(21) Appl. No.: 10/668,917

(22) Filed: Sep. 23, 2003

(65) Prior Publication Data
US 2005/0062266 A1   Mar. 24, 2005

(51) Int. Cl.
*B60R 21/207* (2006.01)
*B60R 21/233* (2006.01)

(52) U.S. Cl. ............ 280/729; 280/730.2; 280/740
(58) Field of Classification Search .......... 280/729, 280/730.2, 736, 740, 741, 742, 743.1
See application file for complete search history.

(56) References Cited

U.S. PATENT DOCUMENTS

| | | | |
|---|---|---|---|
| 3,784,225 A | 1/1974 | Fleck et al. | |
| 3,799,575 A | 3/1974 | Kurze et al. | |
| 5,340,147 A | 8/1994 | Fontecchio et al. | |
| 5,556,128 A | 9/1996 | Sinnhuber et al. | |
| 5,586,782 A | 12/1996 | Zimmerman, II et al. | |
| 5,611,563 A | 3/1997 | Olson et al. | |
| 5,803,485 A * | 9/1998 | Acker et al. ............. | 280/728.2 |
| 5,913,536 A | 6/1999 | Brown | |
| 5,927,748 A | 7/1999 | O'Driscoll | |
| 6,059,312 A | 5/2000 | Staub et al. | |
| 6,213,500 B1 | 4/2001 | Jost et al. | |
| 6,270,113 B1 * | 8/2001 | Wipasuramonton et al. ..... 280/730.2 |
| 6,349,964 B1 * | 2/2002 | Acker et al. ............. | 280/730.2 |
| 6,467,805 B1 | 10/2002 | Schnöwitz et al. | |
| 2002/0185845 A1 | 12/2002 | Thomas et al. | |
| 2003/0006587 A1 | 1/2003 | Jang et al. | |
| 2003/0160433 A1 * | 8/2003 | Kumagai et al. ........... | 280/729 |
| 2004/0021304 A1 * | 2/2004 | Tanase et al. ............. | 280/729 |
| 2004/0075254 A1 * | 4/2004 | Honda .................... | 280/730.2 |

* cited by examiner

*Primary Examiner*—Paul N. Dickson
*Assistant Examiner*—Laura B. Rosenberg
(74) *Attorney, Agent, or Firm*—Sally J Brown

(57) ABSTRACT

An airbag module is disclosed which, in one configuration, inflates from a vehicle seat to protect a vehicle occupant against lateral impact. The airbag module has a cushion with a pelvic chamber and a thoracic chamber. The airbag module also has an inflation assembly including an inflator within a housing inside the cushion. The housing has an aperture disposed within each of the chambers such that, when the inflator deploys, the pelvic chamber is inflated to a relatively higher pressure. The inflator may be moved axially within the housing to control the pressure ratio between the chambers. The housing is attached to the vehicle seat via attachment features that may be located at a variety of positions with respect to the remainder of the housing to facilitate adaptation of the inflation assembly to multiple cushion and vehicle configurations.

23 Claims, 5 Drawing Sheets

DUAL CHAMBER SIDE AIRBAG APPARATUS AND METHOD

BACKGROUND OF THE INVENTION

1. Field of the Invention

The present invention relates to systems and methods for protecting vehicle occupants from injury. More specifically, the present invention relates to a side impact airbag with two chambers that can be inflated to different pressures.

2. Description of Related Art

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the expulsion of rapidly expanding gases from an inflator. The expanding gases fill the airbags, which immediately inflate in front of the driver and passenger to protect them from impact against the windshield.

Side impact airbags such as inflatable curtains and seat mounted airbags have also been developed in response to the need for protection from impacts in a lateral direction, or against the side of the vehicle. Other airbags such as knee bolsters and overhead airbags also operate to protect various part of the body from collision.

It has been discovered that various parts of the body require different levels of impact protection. For example, a seat mounted airbag may inflate beside an occupant of a vehicle seat to protect the pelvis and thorax of the occupant against lateral impact. The weight of the occupant may generally tend to slide with the pelvis; hence, it may be beneficial for the pelvic portion of the seat mounted airbag to inflate stiffly to provide comparatively firm protection. By contrast, the thorax is more sensitive and generally carries less mass, and thus should preferably be more softly cushioned during impact to avoid injury due to contact with the airbag. Such differing impact protection levels are reflected in new automotive safety tests, such as the IIHS test.

Unfortunately, many known airbags, including seat mounted side impact airbags, are only able to inflate to one comparatively uniform pressure level. Hence, a part of the occupant's body may be subject to impact protection that is either too rigid or too soft. Of the known airbag systems designed to provide multiple pressures within a single cushion, many have a number of inherent disadvantages.

More precisely, some such airbag systems have inflators that are somewhat difficult to install in the airbag cushion. Some known systems utilize inflators that are somewhat inflexible in their positioning in the cushion or in the vehicle, and thus cannot readily be used for different airbag configurations. Some such airbag systems use inflators in a manner that provides a strongly directional gas jetting force, thereby requiring strengthened inflator mounting hardware and/or additional safeguards to prevent unintentional deployment. Furthermore, some such airbag systems require the use of snorkels or other comparatively expensive hardware to distribute the gas within the cushion. Yet further, many such systems do not permit easy adaptation of the ratio of gas that flows into the various portions of the cushion, and are thus difficult to adapt for use in multiple vehicle configurations.

SUMMARY OF THE INVENTION

The apparatus of the present invention has been developed in response to the present state of the art, and in particular, in response to the problems and needs in the art that have not yet been fully solved by currently available airbag systems. Thus, it is an overall objective of the present invention to provide an airbag system and related methods that provide multiple inflation pressures and easy adaptability to different vehicle configurations with a minimum of manufacturing and installation cost.

To achieve the foregoing objective, and in accordance with the invention as embodied and broadly described herein in one embodiment, an airbag module is installed in a vehicle to protect at least one occupant of the vehicle from impact. The airbag module has a cushion designed to inflate, for example, to the side of the occupant by deploying from a folded position within the occupant's seat. The cushion is inflated by an inflation assembly that includes an inflator disposed within a housing within the cushion.

The cushion has a pelvic chamber and a thoracic chamber disposed generally above the pelvic chamber. The pelvic chamber inflates beside the pelvis of the occupant to protect the pelvis from lateral impact. Similarly, the thoracic chamber inflates beside the thorax of the occupant to protect the thorax from lateral impact.

The cushion may be made through lay-flat construction, and may thus have an outer seam where two pieces of fabric have been attached together. Additionally, the cushion has a divider that separates the cushion into the thoracic and pelvic chambers. The divider has an end with an insertion surface and a resting surface. The cushion also has an opening in communication with the thoracic chamber. The opening has holes and is designed to be closed against the remainder of the cushion by folding the cushion along a fold line between the opening and the thoracic chamber. The inflation assembly is installed in a mounting region of the cushion, which traverses the divider and is adjacent to the end of the divider.

The inflator has a first end, a second end, and an intermediate portion between the first and second ends. Additionally, the inflator has a plurality of outlet orifices disposed proximate the first end to release inflation gas when the inflator deploys. The first end, and hence the outlet orifices, may be oriented generally downward. The housing may also have a first end and a second end, with a curved wall extending between the first and second ends. The housing may have a generally tubular shape.

A first aperture is defined by the first end, and thus has a generally circular shape. A second aperture is formed in the curved wall, between the first and second ends. The second aperture has an inboard edge and an outboard edge longitudinally displaced from the inboard edge so that the interior of the housing is accessible from along the lateral direction. The housing also has first and second retention ridges disposed on either side of the second aperture. The retention ridges extend inward from the curved wall to grip the inflator such that the inflator remains concentric with the housing.

The housing also has first and second mounting features that serve to attach the inflation assembly to the cushion and to an interior feature of the vehicle, such as a seat, door, A, B, C, or D pillar, or some other portion of the car body. The following discussion assumes that the airbag module is attached to a vehicle seat.

Each of the mounting features may be a fastener with a head and a stud protruding from the head. The first fastener may be disposed near the second end, and may be inserted through a port in the housing. The head may be welded against an opening in the opposite wall of the housing such that the stud protrudes from the housing. The second fastener may be inserted through the second aperture and the head of the second fastener may be welded against an opening formed adjacent to the inboard edge of the second aperture.

The studs protrude from the housing toward the seat. The studs protrude through holes in the mounting region. The cushion is folded over the studs along the fold line, and the studs protrude through the first and second holes of the opening. The cushion is thus generally sealed, and the studs can be attached to the interior framework of the vehicle seat. The studs may be threaded or otherwise shaped for easy attachment.

In response to detection of a collision or an impending collision, an activation signal is transmitted to the inflator. In response, the inflator deploys to produce inflation gas, which exits the inflator through the outlet orifices. The inflation gas enters the housing and separates into first and second flows, which flow toward the first and second apertures, respectively.

The first flow moves directly toward the first aperture, and soon passes the first end of the inflator. The first flow is then able to flow through the entire inside diameter of the housing and exit the first aperture at a comparatively high flow rate. The second flow moves toward the second aperture and flows in the generally annular space between the inflator and the inside diameter of the housing. The second flow then exits the second aperture at a comparatively lower flow rate. The flow rate ratio between the first and second flows causes the pelvic chamber to inflate to a higher pressure than that of the thoracic chamber. Thus, the pelvic chamber is able to resist the comparatively higher momentum of the pelvis, and the thoracic chamber is able to more gently cushion the more sensitive thorax.

The airbag module may be easily assembled. The first and second fasteners may be installed through the port of the housing and the second aperture, respectively, and welded in place so that the studs protrude outward from the housing. The inflator may then be inserted into the housing through either end, such that the first and second retention ridges grip the inflator, thus forming the inflation assembly.

The cushion and the inflation assembly may be designed in such a manner that they can easily be assembled. More precisely, the insertion surface of the end of the divider may be disposed and angled such that the housing, in which the inflator is disposed, may be inserted along its axis into the opening of the cushion and between the insertion surface and the outer seam of the cushion. The housing may then be rotated into alignment with the mounting region so that the housing is sandwiched between the resting surface and the outer seam. The studs may then be inserted through the holes of the mounting region, and the cushion may be folded to close the opening. The cushion may then be installed in the vehicle seat.

The ratio of gases flowing into the pelvic and thoracic chambers may be easily altered by axially adjusting the position of the inflator within the housing. Readjustment of the inflator such that the outlet orifices are closer to the second aperture shortens the path through which the second flow must pass, and lengthens the path through which the first flow must pass. Thus, the flow rate of the second flow is increased and the flow rate of the first flow is decreased to increase the pressure of the thoracic chamber relative to that of the pelvic chamber. Similarly, readjustment of the inflator in the opposite direction increases the pressure of the pelvic chamber relative to that of the thoracic chamber. Thus, the inflation assembly may easily be adjusted to suit different cushions, occupants, or vehicles.

According to one alternative embodiment, the fasteners may be disposed at different positions with respect to the curved wall of the housing to suit different vehicle seat configurations. For example, the first fastener may be displaced further from the second end, and the second fastener may be disposed between the second aperture and the first end of the housing. The first and second holes formed in the cushion, proximate the opening, may be disposed in the same position, so that the inflation assembly is elevated to a higher position with respect to the cushion.

With such a configuration, the cushion may be mounted to the same location of the seat as in previous embodiments, but the inflation assembly is disposed higher in the seat, and thus the package that forms the airbag module is disposed higher within the seat. Repositioning of the fasteners with respect to the curved wall of the housing may also be used to change the location at which the fasteners are attached to the seat, if desired. Thus, multiple seat, vehicle, and cushion configurations can be further accommodated by the inflation assembly of the present invention.

Through the use of the airbag assembly and related methods of the present invention, cost savings may be obtained through the use of common inflation assembly parts for multiple different airbag systems. Additionally, two different inflation pressures may be provided within a single cushion without requiring expensive mounting or gas delivery hardware. As a result, the availability and effectiveness of vehicular airbag systems may be enhanced.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

The present invention utilizes principles of gas flow resistance to enable inflation gas to be effectively delivered to multiple chambers of a cushion to provide different inflation pressures. Furthermore, the present invention uses parts that can be assembled in multiple ways to facilitate adaptation of inflation hardware to multiple cushion and vehicle configurations. The manner in which these principles are utilized in the present invention will be shown and described in greater detail in the following discussion.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured unitarily, i.e., as a single piece, without requiring the assembly of multiple pieces. Multiple parts may be integrally formed with each other if they are formed from a single workpiece.

Figure 1:
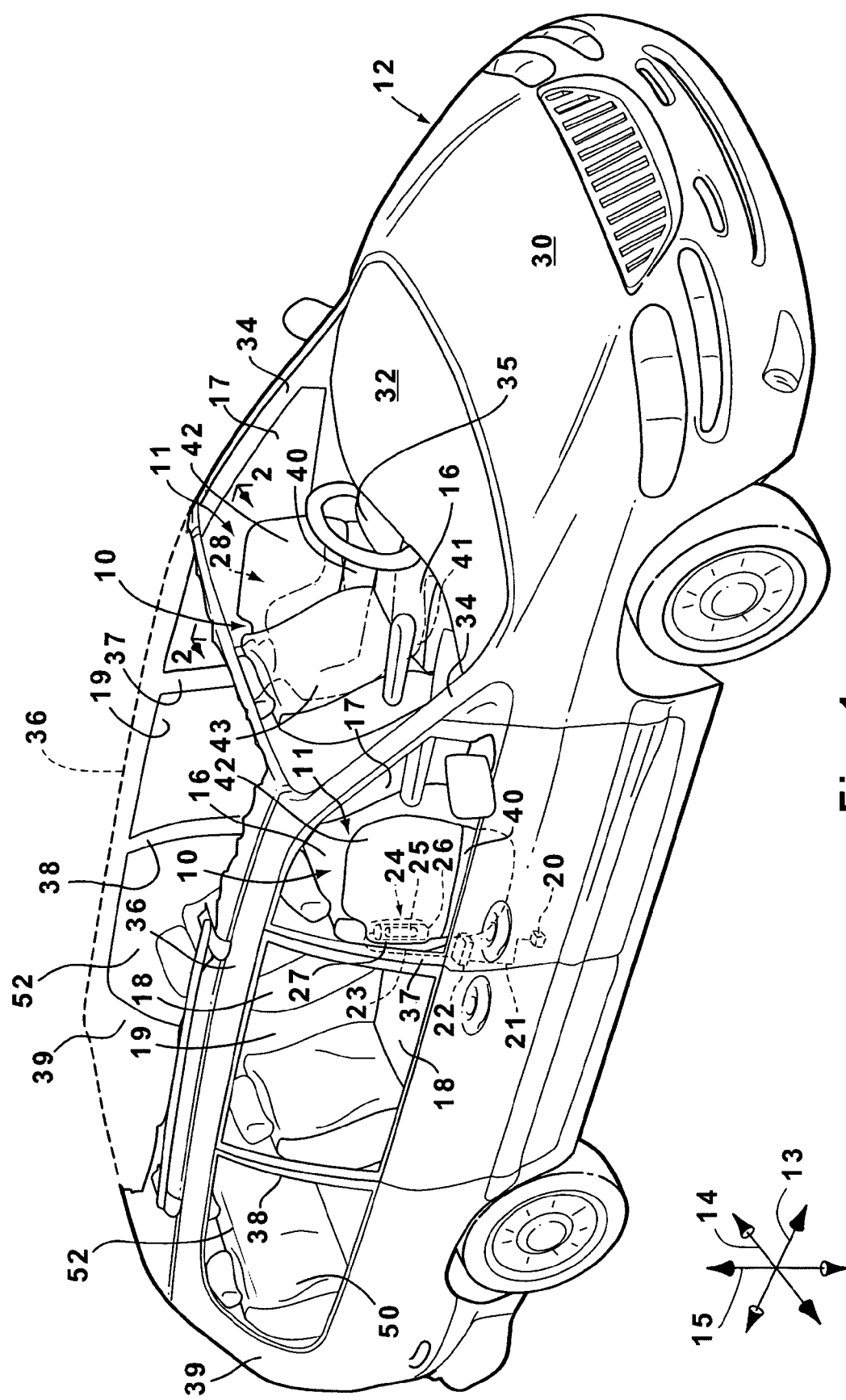
FIG. 1 is a perspective view of a vehicle with an airbag module according to one embodiment of the invention.

Referring to FIG. 1, a perspective view illustrates a pair of airbag modules 10 according to one embodiment of the invention. Each of the airbag modules 10 has a cushion 11 designed to inflate to provide side impact protection within a vehicle 12. The airbag modules 10 may form part of an airbag system with additional airbag modules designed to provide different types of impact protection.

The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted. As shown, two such airbag modules 10 may be used: one for the driver's side of the vehicle 12, and the other for the passenger's side.

One or more accelerometers 20 or other impact sensing devices detect sudden lateral acceleration (or deceleration) of the vehicle 12 and transmit electric signals via an electric line 21 to an electronic control unit 22, or ECU 22. The ECU 22 may control various aspects of the safety system of the vehicle 12. The ECU 22 generates a corresponding activation signal, which is transmitted via an electric line 23 to one or more inflation assemblies 24 that provide pressurized gas to inflate the cushions 11. As shown in FIG. 1, a separate inflation assembly 24 may be used to inflate each of the cushions 11. Each of the inflation assemblies 24 includes an inflator 25 and a housing 26 that contains the corresponding inflator 25 and channels the gas flow from the inflator 25 into the corresponding cushion 11.

As shown, the inflation assemblies 24 are disposed within the front seats 16. In alternative embodiments, the inflation assemblies 24 may be installed in door panels, A pillars, B pillars, C pillars, or D pillars of the vehicle. The cushions 11 are compacted and stored within the front seats 16 until deployment occurs. The cushions 11 then deploy through deployment seams 27 formed in the seats 16. The deployment seams 27 may utilize break-away stitching or some other mechanism to enable the deployment seams 27 to open rapidly and release the cushions 11. As illustrated, each cushion 11 inflates forward, between an occupant 28 of one of the front seats 16 and the adjacent front door 17.

The inflators 25 of the embodiment depicted in FIG. 1 may be of any known type, including pyrotechnic, compressed gas, and hybrid inflators. The inflators 25 provide inflation gas to inflate the cushions 11 in response to receipt of activation signals. In the exemplary configuration of FIG. 1, the inflators 25 are enveloped within the cushions 11 so that inflation gases exiting each inflator 25 flows into the corresponding housing 26, and thence, directly into the corresponding cushion 11. The inflators 25 may operate with such rapidity that, before the vehicle 12 has fully reacted to the impact, the cushions 11 have inflated to protect vehicle occupants from impact.

Optionally, the accelerometers 20 may be stowed within an engine compartment 30 or dashboard 32 of the vehicle 12. If the accelerometers 20 are remotely positioned, the electric line 21, 23 and/or other control wiring may run through the front seats 16 to the floor of the vehicle 12, and thence to any desirable location within the vehicle 12. Otherwise, each accelerometer 20 may be positioned near one of the inflation assemblies 24, as shown in FIG. 1.

The airbag modules 10 shown in FIG. 1 represent only one potential configuration according to the invention. Those of skill in the art will recognize that the principles of the invention could be readily applied to a wide variety of airbag types, including driver's and passenger's side front impact airbags, knee bolsters, inflatable curtains, and overhead airbags. Such airbags may, for example, be coupled to a pair of A pillars 34 disposed on either side of a windshield 35, to roof rails 36, to B pillars 37, C pillars 38, and/or D pillars 39 disposed rearward of the A pillars 34, or to any other suitably disposed interior part of the vehicle 12.

Each cushion 11 may have a first chamber 40, or pelvic chamber 40, configured to cushion a pelvis 41 of the occupant 28. Each cushion 11 also has a second chamber 42, or thoracic chamber 42, positioned to cushion a thorax 43 of the occupant 28. The pelvic and thoracic chambers 40, 42 may be generally separated from each other to maintain a pressure differential during deployment of the airbag module 10. The pelvic chamber 40 may be inflated to a pressure somewhat higher than that of the thoracic chamber 42 because the pelvis 41 may be expected to carry more load in a collision, while the thorax 43 has less momentum and is more easily injured due to impact.

Airbag modules similar to the airbag modules 10 illustrated in FIG. 1 may also be installed in the rear seats 18 to protect occupants of rear seats 18 of the vehicle 12. The vehicle 12 may also have extra seats 50 disposed behind the rear seats 18. Airbag modules like the airbag modules 10 illustrated in FIG. 1 may also be installed in the extra seats 50 to protect occupants of the extra seats 50 from lateral impact against third lateral surfaces 52 of the vehicle 12. Furthermore, other airbag types, and/or cushions with different numbers of chambers are contemplated within the scope of the invention.

The airbag modules 10 may be adaptable to a variety of vehicle and/or seat configurations, protection schemes, and the like. The configuration of the airbag modules 10 will be described in greater detail in connection with FIG. 2.

Figure 2:
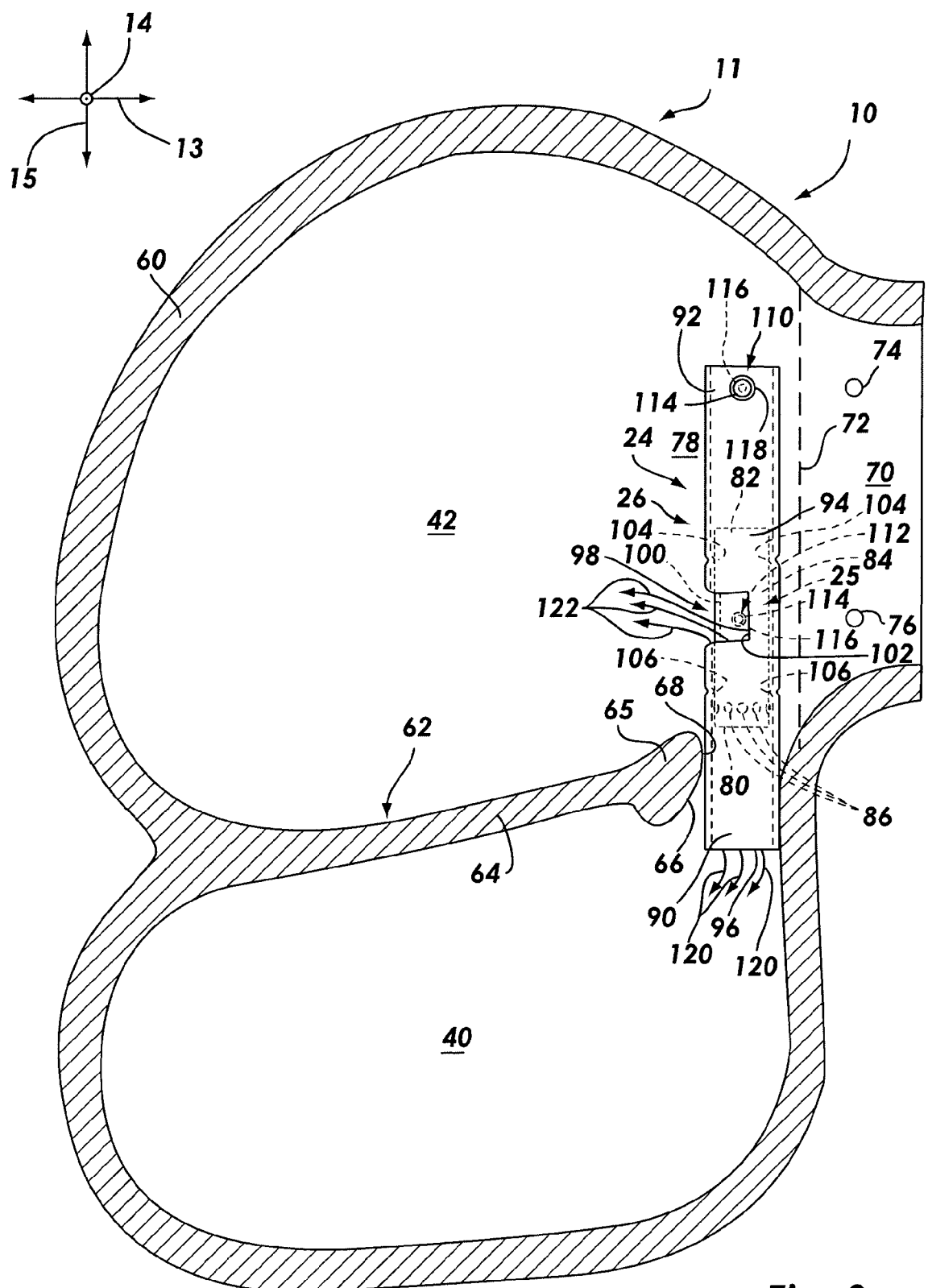
FIG. 2 is a side elevation, cross sectional view of the airbag module of FIG. 1.

Referring to FIG. 2, a side elevation, section view illustrates one of the airbag modules 10 of FIG. 1 during deployment. For clarity, the inflation assembly 24 has not been sectioned. As illustrated, the cushion 11 of the airbag module 10 may be manufactured via "lay-flat construction," and may thus be formed by peripherally attaching two pieces of similarly shaped fabric together to form an outer seam 60. Attachment may be performed via one-piece weaving (OPW), sewing, RF welding, fastening, or any other known method.

A divider 62 may be formed in a manner that is relatively continuous with the outer seam 60 to separate the cushion 11 into the pelvic chamber 40 and the thoracic chamber 42. The divider 60 has an elongated portion 64 with an end 65 offset from the opposing portion of the outer seam 60. The end 65 may have a relatively carefully selected shape, with an insertion surface 66 and a resting surface 68, the function of which will be described subsequently.

The inflation assembly 24 may be generally sandwiched between the resting surface 68 and the opposing portion of the outer seam 60 so that gas flow between the chambers 40, 42 can only occur through the inflation assembly 24. The isolation of the chambers 40, 42 from each other is sufficient to maintain a significant pressure differential between chambers 40, 42 for at least about fifty milliseconds, which may be long enough to last the duration of the collision event. The inflator 25 and the housing 26 are relatively sized such that the generally annular space between the inflator 25 and the housing 26 provides a constricted path to inflation gas moving between the pelvic and thoracic chambers 40, 42. Hence, inflation gas flow between the chambers 40, 42 through the housing 26 is restricted to help maintain the pressure differential between the chambers 40, 42.

The cushion 11 also has an opening 70 in communication with the thoracic chamber 42. In alternative embodiments, the opening 70 may instead be disposed proximate the pelvic chamber 40. The opening facilitates insertion of the inflation assembly 24 into the cushion 11. The opening 70 will ultimately be folded against the remainder of the cushion along a fold line 72 to close the opening 70. A first hole 74 and a second hole 76 are formed in the cushion 11, within the opening 70 to facilitate closure of the opening 70 and attachment of the airbag module 10 to the corresponding seat 16 in a manner that will be described subsequently.

A mounting region 78 extends generally along the transverse direction 15 and passes between the end 65 of the divider 62 and the adjacent portion of the outer seam 60 of the cushion 11. The mounting region 78 thus traverses the divider 62 so that part of the mounting region 78 is within the thoracic chamber 42, and part is within the pelvic chamber 40. The inflation assembly 24 is disposed in the mounting region 78. In alternative embodiments, the inflation assembly 24 may be disposed partially within the cushion 11 or entirely outside the cushion 11, and gas guides or other hardware may be used to convey inflation gas into the chambers 40, 42. The cushion 11 may be reconfigured to facilitate such alternative positioning of the inflation assembly 24.

As shown, the inflator 25 has a first end 80 and a second 82, which may be positioned toward the pelvic and thoracic chambers 40, 42, respectively. An intermediate portion 84 extends between the first and second ends 80, 82. A plurality of outlet orifices 86 are disposed proximate the first end 80. The outlet orifices 86 are arrayed about the circumference of the inflator 25 so that gases flow radially out of the outlet orifices 86 during deployment to provide substantially thrust neutral operation. Thus, the inflator 25 need not be restrained in a manner that must significantly compensate for deployment thrust.

The housing 26 also has a first end 90 and a second end 92, which are disposed toward the pelvic and thoracic chambers 40, 42, respectively. The housing 26 may be generally tubular in shape, but in alternative embodiments, may have any cross sectional shape including curved and flat-sided shapes. The inflator 25 is disposed within the housing 26. In the embodiment of FIG. 2, the inflator 25 is entirely within the housing 26, i.e., the inflator 25 does not protrude from the envelope defined by the housing 26. However, in this application, disposition "within" the housing does not require that every part of the inflator 25 be within the envelope defined by the housing 26.

The housing 26 also has a curved wall 94 extending between the first and second ends 90, 92. A first aperture 96 and a second aperture 98 are formed in the housing 26 to permit inflation gas to flow into the pelvic and thoracic chambers 40, 42, respectively. The first aperture 96 is defined by the first end 90 of the housing 26, and thus has a shape equivalent to the cross sectional shape of the interior of the first end 90, e.g., a circular shape. The second aperture 98 is formed in the curved wall 94 at a relatively central location of the housing 26.

The second aperture 98 has an inboard edge 100, which will be disposed toward the corresponding seat 16. The second aperture 98 also has an outboard edge 102. As shown, the inboard and outboard edges 100, 102 are longitudinally displaced from each other so that the interior surface of the housing 26 is accessible through the second aperture 98 along the lateral direction 14.

The housing 26 has a first retention ridge 104 and a second retention ridge 106 disposed on either side of the housing 26. Each of the retention ridges 104 may be formed by crimping two or more opposing, arcuate portions of the curved wall 94 inward. The retention ridges 104 may not extend full circle around the interior of the curved wall 94 because such a configuration may unduly block gas flow in the transverse direction 15 within the housing 26.

The housing 26 may be attached to the seat 16 via a first mounting feature 110 and a second mounting feature 112. The first and second mounting features 110, 112 may be first and second fasteners 110, 112, respectively. Each of the fasteners 110, 112 includes a head 114 and a stud 116 extending form the head 114. The stud 116 of each of the fasteners 110, 112 may be threaded or otherwise shaped to facilitate attachment to the seat 16.

The first fastener 110 may be disposed proximate the second end 92 of the housing 26. The first fastener 110 may be inserted through a port 118 formed in the outboard side of the housing 26 (e.g., the side closest to the viewing point of FIG. 2) such that the stud 116 passes through a hole (not shown) in the inboard side. The stud 116 then extends from the curved wall 94 toward the seat 16. The head 114 may be welded or otherwise attached to the inside surface of the curved wall 94 proximate the hole to keep the first fastener 110 in place.

The second fastener 112 may be disposed adjacent to the inboard edge 100 of the second aperture 98. The second fastener 112 may be inserted through the second aperture 98 due to the position of the outboard edge 102, which is longitudinally offset from the inboard edge 100. The stud 116 of the second fastener 112 then passes through a hole (not shown) adjacent to the inboard edge 100 such that the stud 116 extends from the curved wall 94 toward the seat 16. The head 114 is welded or otherwise attached to the inside surface of the curved wall 94 proximate the hole to keep the second fastener 112 in place.

When a collision is detected, an activation signal is transmitted to the inflator 25 via the electric line 23 (not shown in FIG. 2). The inflator 25 deploys to produce inflation gas, which exits the inflator 25 via the outlet orifices 86. The inflation gas is divided into a first flow 120 and a second flow 122. The first flow 120 rapidly moves past the first end 80 of the inflator 25, and then has a flow path with an area equivalent to the entire cross section of the interior of the first end 90 of the housing 26. Thus, the first flow 120 is comparatively unrestricted and is able to flow out of the first aperture 96 at a relatively high flow rate to enter the pelvic chamber 40.

The second flow 122 moves toward the second aperture 98 within the generally annular space between the inflator 25 and the curved wall 94 of the housing 26. The generally annular space provides a more restricted flow path due to comparatively tight spacing between the curved wall 94 and the inflator 25. The second flow 122 then exits the housing 26 via the second aperture 98 to reach the thoracic chamber 42. The second flow 122 thus enters the thoracic chamber 42 at a comparatively low flow rate. The flow rate ratio between the first and second flows 120, 122 causes the pelvic chamber 40 to inflate to a pressure higher than that of the thoracic chamber 42. The flow rate of the first flow 120 need not necessarily be higher than that of the second flow 122 because the relative volumes of the pelvic and thoracic chambers 40, 42 must also be taken into account in determining the relative inflation pressures.

If desired, the second end 92 of the housing 26 may be open like the first end 90. Thus, a residual flow of inflation gas (not shown) may exit the housing 26 to enter the thoracic chamber 42 via the second end 92 or the port 118. In addition, the housing 26 may have other openings or slots (not shown), if desired. As the first and second flows 120, 122 move along the curved wall 94 of the housing 26, the housing 26 absorbs heat from the inflation gas to cool the first and second flows 120, 122, thereby reducing the probability of thermal damage to the cushion 11.

Figure 3:
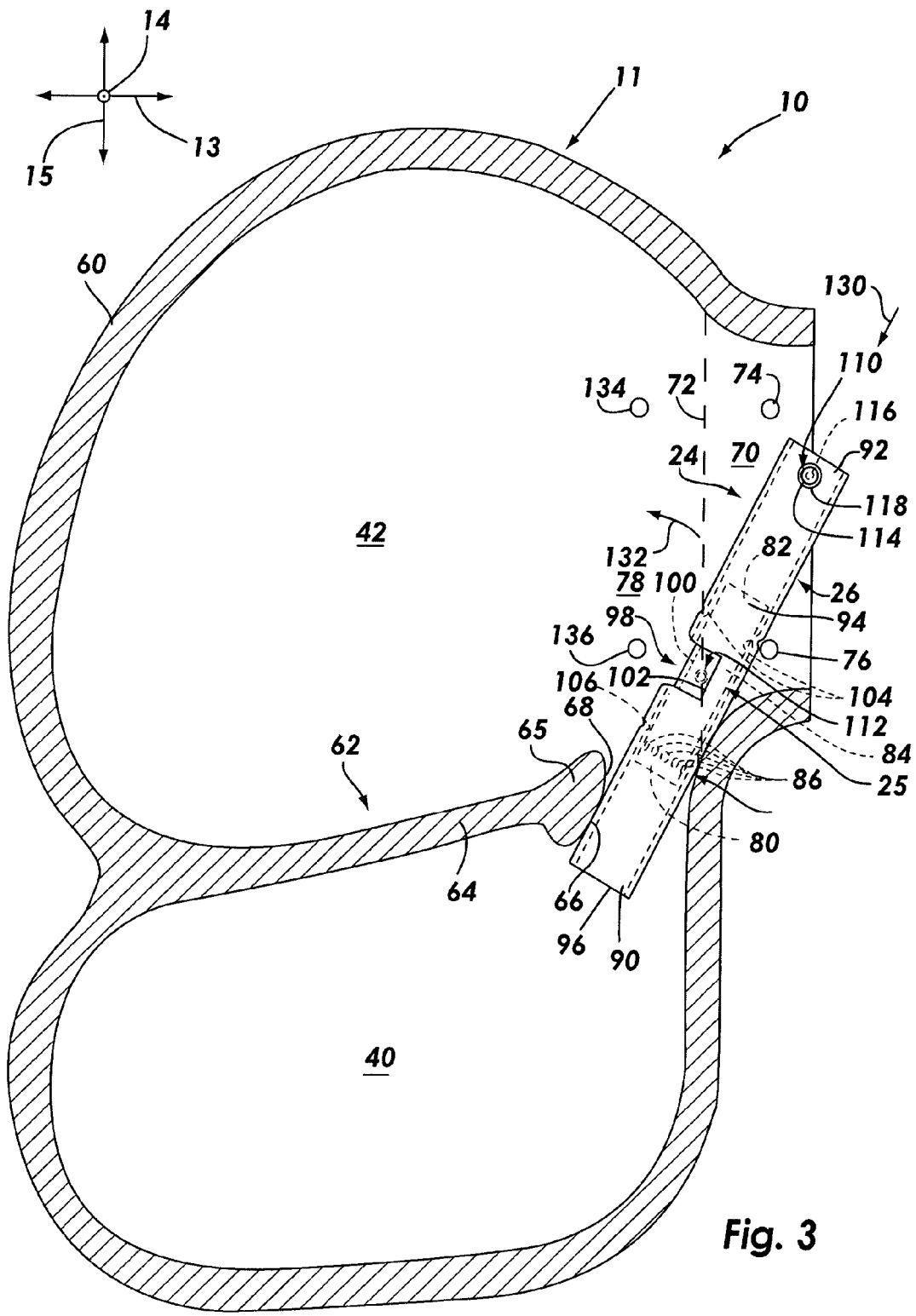
FIG. 3 is a side elevation, cross sectional view illustrating one method of assembling the inflator and the cushion of FIG. 1.

Referring to FIG. 3, a side elevation, section view illustrates one manner in which the airbag module 10 may be assembled. The airbag module 10 is relatively easy to manufacture and assemble.

The housing 26 may be manufactured by, first, cutting a piece of steel tubing to length and punching or otherwise forming the second aperture 98, the port 118, and the holes (not shown) from which the studs 116 protrude from the housing 26, in the piece of steel tubing. The retention ridges 104, 106 may be formed in the curved wall 94 through the use of a crimping operation or the like. The first and second fasteners 110, 112 may then be positioned and fixed in place, as described previously.

When the housing 26 has been formed, the inflator 25 may be inserted into the housing 26 through the first end 90 or the second end 92 of the housing 26. The inflator 25 need not be configured as shown, and may be any of several known models currently available on the market. In alternative embodiments, different inflator types may be used, including the much shorter inflators typically used for driver's side airbag modules. The inflator 25 may be coupled to the electric line 23 before or after insertion of the inflator 25 into the housing 26. The inflation assembly 24 is then ready for installation in the cushion 11.

The end 65 of the divider 62 is contoured to facilitate insertion of the inflation assembly 24 into the cushion 11. More precisely, the insertion surface 66 of the end 65 is angled and disposed such that the housing 26 is able to be inserted into the opening 70 and into the space between the end 65 and the opposing portion of the outer edge 60 along a substantially straight path. An arrow 130 represents the direction along which the inflation assembly 24 is inserted into the cushion 11.

Thus, an installer need not insert the inflation assembly 24 into the cushion 11 and then blindly attempt to slide the inflation assembly 24 into place. Rather, after the inflation assembly 24 has been inserted into the cushion 24, the installer rotates the inflation assembly 24 along the direction indicated by the arrow 132 until the inflation assembly 24 is positioned as shown in FIG. 2. When the inflation assembly 24 has reached the proper position, the studs 116 of the first and second fasteners 110, 112 are inserted through corresponding first and second holes 134, 136, respectively, formed in the mounting region 78.

After the studs 116 have been inserted through the first and second holes 134, 136, the cushion 11 is folded along the fold line 72 to align the first and second holes 74, 76 of the opening 70 with the first and second holes 134, 136 of the mounting region 78. The studs 116 of the first and second fasteners 110, 112 are inserted through the first and second holes 74, 76, respectively, to close the opening 70.

The cushion 11 may then be folded around the inflation assembly 24, either manually or through the use of automated equipment. A cloth wrapper, plastic clam shell, or the like (not shown) may be wrapped or otherwise installed around the airbag module 10 to keep the cushion 11 folded until deployment. Such a wrapper may also be attached to the studs 116 of the fasteners 110, 112, and may be designed to rupture during deployment to permit the cushion 11 to unfold. The packaged airbag module 10 may then be installed in the seat 16 of the vehicle 12.

Figure 4:
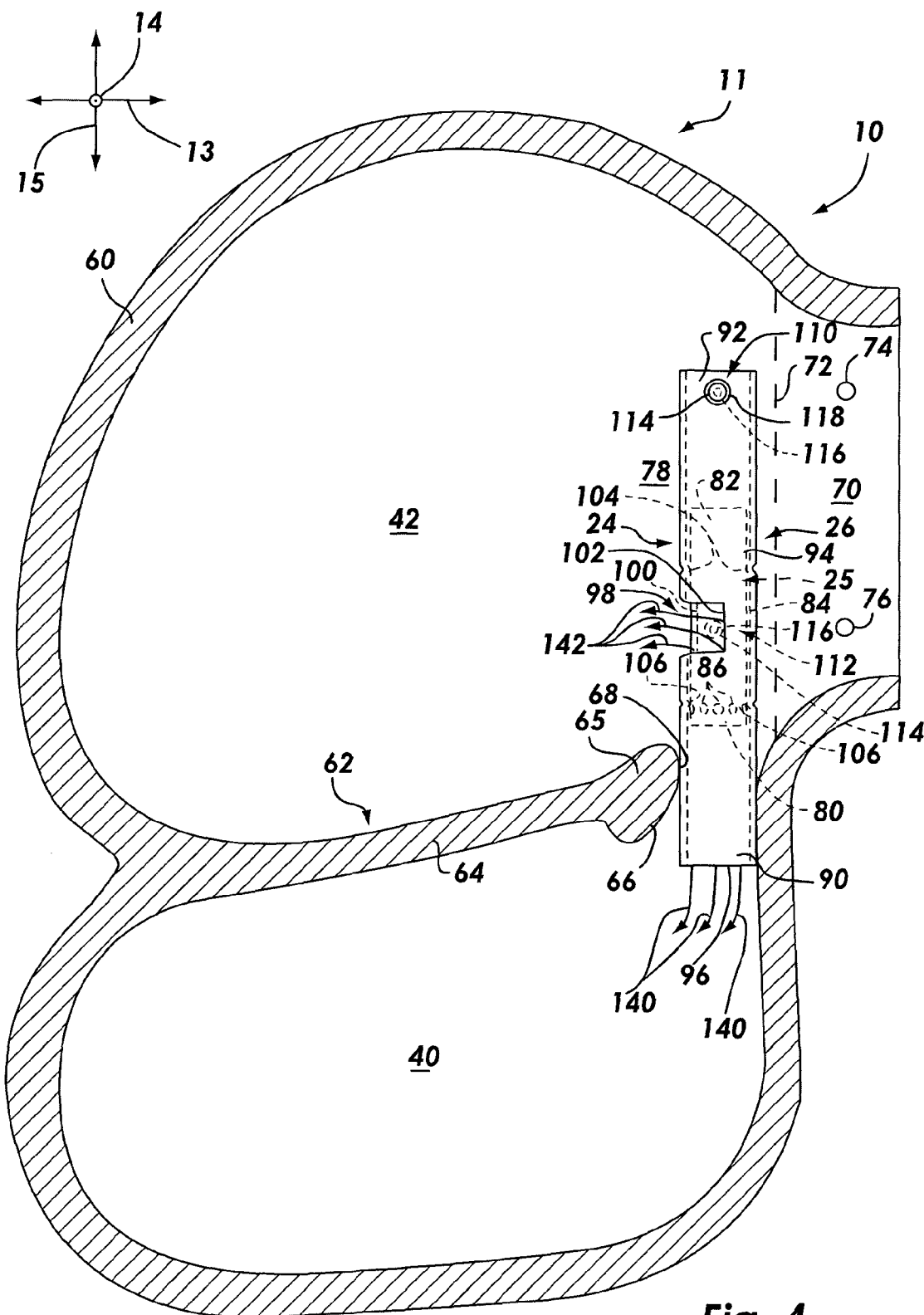
FIG. 4 is a side elevation, cross sectional view of the airbag module of FIG. 1, with the inflator disposed in an alternative position within the housing.
Figure 5:
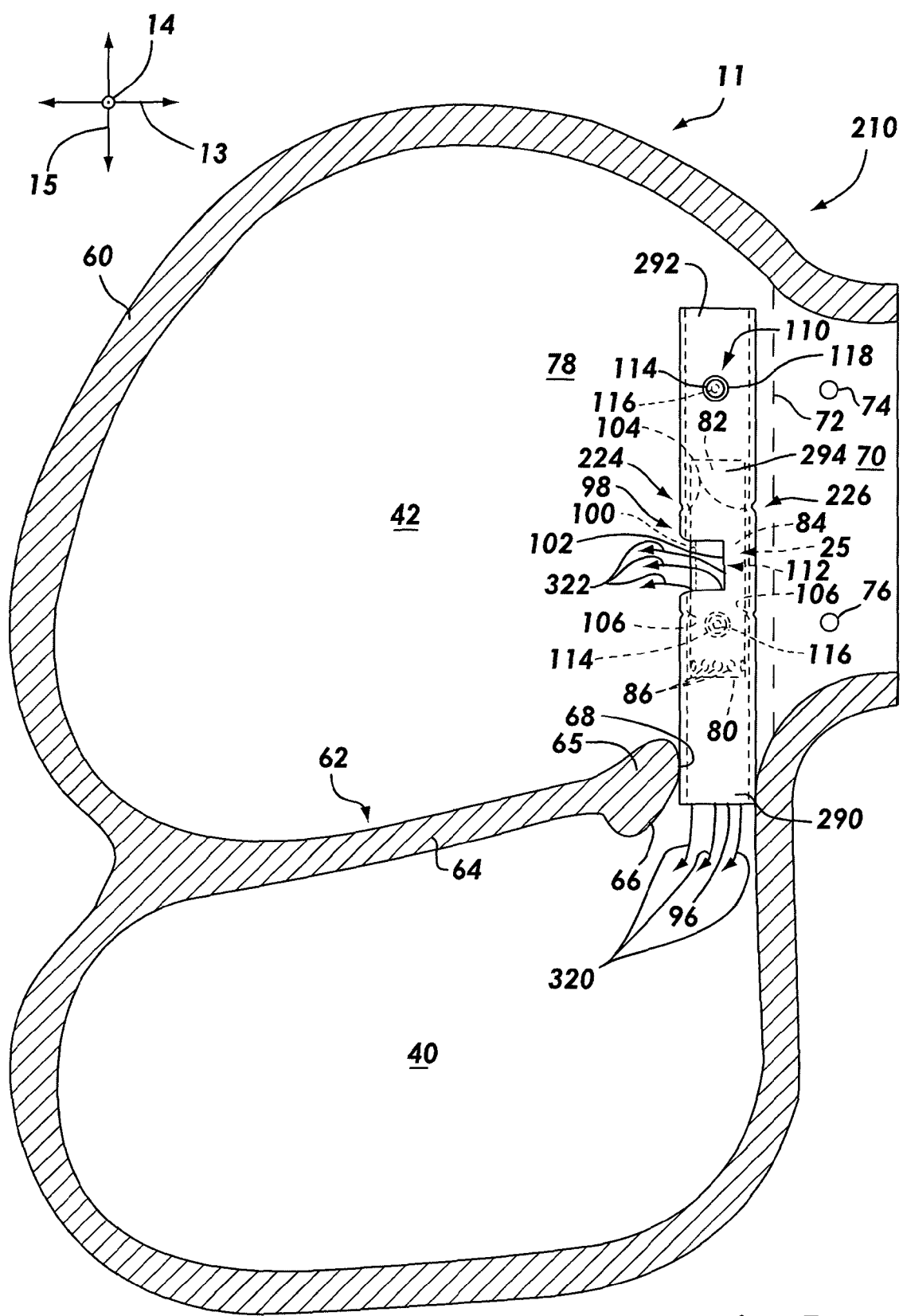
FIG. 5 is a side elevation, cross sectional view of an airbag module according to one alternative embodiment of the invention, with the mounting features disposed at a different location on the housing.

The inflation assembly 24 may be adapted in a number of ways to suit different cushion or vehicle configurations. Furthermore, the inflation assembly 24 may be easily adapted to vary the pressure of the pelvic chamber 40 relative to that of the thoracic chamber 42. FIG. 4 illustrates a modification that provides a different pressure ratio, and FIG. 5 illustrates an alternative embodiment that enables the airbag module to be installed in a different location in the seat.

Referring to FIG. 4, a side elevation, section view illustrates the airbag module 10 with the inflator 25 repositioned within the housing 26 to increase the pressure of the thoracic chamber 42 relative to that of the pelvic chamber 40. More precisely, in FIG. 4, the inflator 25 has been disposed nearer the second end of the housing 92 than in FIG. 2. Hence, the outlet orifices 86 of the inflator 25 have been moved closer to the second aperture 98 and further from the first aperture 96.

Consequently, a first flow 140 of inflation gas exiting the housing 26 now has a longer exit path than that of the first flow 120 of FIG. 2, and a second flow 142 of inflation as exiting the housing 26 has a shorter exit path than that of the second flow 122 of FIG. 2. Thus, with the same inflator 25 and cushion 11, the first flow 140 has a lower flow rate than that of the first flow 120 of FIG. 2, and the second flow 142 has a higher flow rate than that of the second flow 122 of FIG. 2. Therefore, the thoracic chamber 42 is inflated to a higher pressure than with the configuration of FIG. 2, and the pelvic chamber is inflated to a lower pressure.

Such flow rate adjustment, or "tuning," facilitates adaptation of the airbag module 10 to multiple cushions and vehicles. For example, if a cushion with a larger pelvic chamber is to be used, the flow to that chamber may be increased relative to the flow to the corresponding thoracic chamber to ensure that the desired pressure differential is obtained. Different seats, vehicle sizes, and the like may also make such tuning desirable.

Referring to FIG. 5, a side elevation, section view illustrates an airbag module 210 according to one alternative embodiment of the invention. The airbag module 210 may be installed in a vehicle seat such as the seat 16 of the vehicle 12 of FIG. 1 to provide side impact protection in a manner similar to that of the previous embodiment.

As shown, the airbag module 210 has a cushion 11 like that of the previous embodiment. An inflation assembly 224 is disposed within the cushion 210.

The inflation assembly 224 has an inflator 25 like that of the previous embodiment and a housing 226, which may have a configuration somewhat different from that of the housing 26. More precisely, the housing 226 has a first end 290, a second end 292, and a curved wall 294 extending between the first and second ends 290, 292. A first aperture 96 is disposed at the first end 290 and a second aperture 98 is formed in the curved wall 294 between the first and second ends 290, 292. The first and second apertures 96, 98 are configured in a manner similar to those of the previous embodiment. The housing 226 also has first and second retention ridges 104, 106 like those of the previous embodiment.

Additionally, the housing 226 has a first mounting feature 110 and a second mounting feature 112. The mounting features 110, 112 may be fasteners like those of the previous embodiment. However, they are disposed at different locations with respect to the remainder of the housing 226 than in the previous embodiment. More precisely, the first fastener 110 is displaced somewhat from the second end 292 of the housing 226, and the second fastener 112 is also displaced from the second aperture 98 toward the first end 290.

However, the first and second holes 74, 76 of the opening 70 are positioned as in the previous embodiment. Hence, the fasteners 110, 112 have the same position with respect to the cushion 11, but the inflation assembly 224 as a whole has been repositioned in the transverse direction 15 with respect to the cushion 11. The inflator 25 is disposed in the same position within the housing 226 as in FIG. 2, and the first and second apertures 96, 98 are still disposed within the pelvic and thoracic chambers 40, 42, respectively.

A first flow 320 of inflation gas enters the pelvic chamber 40 and a second flow 322 of inflation gas enters the thoracic chamber 42. The first and second flows 320, 322 may be generally equivalent in flow rate to the first and second flows 120, 122, respectively, of FIG. 2. Hence, the pelvic and thoracic chambers 40, 42 will inflate to substantially the same pressures as in the previous embodiment (without the inflator position adjustment of FIG. 4).

As a result of the new position of the fasteners 110, 112, the inflation assembly 224 may be mounted at a higher position in the seat 16. Furthermore, since the cushion 11 is generally folded around the inflation assembly 224, the entire airbag module 210 is disposed at a higher position in the seat 16, without moving the attachment locations of the fasteners 110, 112 within the seat. Alternatively, the attachment locations of the fasteners 110, 112 may be moved downward in the seat 16 and the position of the airbag module 210 within the seat 16 may be the same as in the previous embodiment.

In alternative embodiments, the positions of the fasteners 110, 112 with respect to the cushion 11 may alternatively or additionally be changed. In such a case, the inflation assembly 226 may or may not be repositioned with respect to the cushion 11, as determined by the space available for the airbag module 210 within the seat 16. Such configurations may permit further adaptation of an airbag module for alternative cushion or vehicle configurations.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An airbag module for protecting an occupant of a vehicle from impact, the airbag module comprising:
   a cushion comprising a divider that defines a first chamber and a second chamber within the cushion;
   an inflator that produces inflation gas in response to receipt of an activation signal; and
   a housing comprising a first aperture and a second aperture, wherein the housing is shaped to retain the inflator at any of a plurality of positions to enable tuning of a flow rate of a first flow of inflation gas into the first chamber via the first aperture and tuning of a flow rate of a second flow of inflation gas into the second chamber via the second aperture;
   wherein the airbag module is a side airbag module to be installed in a vehicle feature selected from the group consisting of a seat occupied by the occupant, a door of the vehicle, a B pillar of the vehicle, a C pillar of the vehicle, and a D pillar of the vehicle, wherein the first chamber comprises a pelvic chamber shaped to inflate alongside a pelvis of the occupant and the second chamber comprises a thoracic chamber shaped to inflate alongside a thorax of the occupant and wherein the cushion comprises an opening in communication with the thoracic chamber wherein the housing has a generally tubular shape with a first end, a second end and a curved wall extending therebetween, wherein the first end of the housing defines a first axial aperture for enabling a first gas flow into the pelvic chamber.

2. The airbag module of claim 1, wherein the inflator is positioned within the housing such that the pelvic chamber inflates to a higher pressure than a pressure to which the thoracic chamber is inflated.

3. The airbag module of claim 1, wherein the housing is disposed within the cushion.

4. The airbag module of claim 3, wherein the housing comprises an elongated shape and the cushion comprises a mounting region having a length sufficient to permit lengthwise positioning of the housing at a plurality of locations within the mounting region to permit installation of the housing at a plurality of locations with respect to a seat of the vehicle.

5. The airbag module of claim 1, wherein the housing comprises a mounting feature disposed to facilitate attachment of the housing to the seat.

6. The airbag module of claim 5, wherein the mounting feature comprises a stud, wherein the cushion comprises an opening in communication with the second chamber, wherein the stud protrudes from the cushion and the cushion is folded over the stud to prevent gas from escaping the cushion via the opening.

7. The airbag module of claim 1, wherein the housing comprises a retention ridge extending inward to retain the inflator generally coaxial with the housing, wherein the plurality of positions are displaced from each other along an axis of the housing.

8. The airbag module of claim 1, wherein the inflator comprises an outlet orifice and the housing has a generally tubular shape with a first end, a second end, and a curved wall extending between the first and second ends, wherein the first aperture is defined by the first end and the second aperture is formed in the curved wall such that the outlet orifice is disposed generally between the first and second apertures.

9. The airbag module of claim 1, wherein the cushion comprises an outer wall having an opening in communication with the second chamber, wherein the divider comprises an end adjoining the mounting region, the end having an insertion surface and a resting surface, wherein the insertion surface is disposed to permit translation of the housing through the opening and between the insertion surface and the outer wall, wherein the resting surface is disposed to permit subsequent rotation of the housing to dispose the housing between the resting surface and the outer wall to substantially prevent gas flow between the first and second chambers, outside the housing.

10. The airbag module of claim 1, wherein the divider abuts the housing to restrict gas flow between the first and second chambers to enable maintenance of a pressure differential between the first and second chambers for at least about fifty milliseconds.

11. The airbag module of claim 10, wherein the housing and the inflator are relatively sized to provide a constricted flow path between the first and second chambers, through the housing, to restrict gas flow between the first and second chambers.

12. The airbag module of claim 10, wherein the housing is disposed to receive heat directly from the first and second flows, thereby cooling the first and second flows during motion of the first and second flows toward the first and second chambers, respectively.

13. The airbag module of claim 1 wherein the curved wall of the housing defines a second aperture for a second gas flow into the thoracic chamber.

14. The airbag module of claim 1 wherein at least the main part of the housing is located in the thoracic chamber and the first end of the housing extends into the pelvic chamber.

15. A method for controlling inflation gas flow into a cushion of an airbag module for protecting an occupant of a vehicle from impact, the cushion comprising a divider that defines a first chamber and a second chamber, the airbag module further comprising an inflator that produces inflation gas in response to receipt of an activation signal and a housing shaped to retain the inflator at any of a plurality of positions, the method comprising:
    establishing a first desired pressure to which the first chamber is to be inflated and a second desired pressure to which the second chamber is to be inflated;
    determining which position of a plurality of positions of the inflator with respect to the housing will most nearly provide the first and second pressures; and
    installing inflator at the determined position within the housing.

16. The method of claim 15, wherein the cushion further comprises a mounting region that traverses the divider, the method further comprising installing the housing and the inflator within the mounting region.

17. The method of claim 16, further comprising attaching the cushion to the seat such that the cushion forms a side airbag and the first chamber comprises a pelvic chamber shaped to inflate alongside a pelvis of the occupant and the second chamber comprises a thoracic chamber shaped to inflate alongside a thorax of the occupant.

18. The method of claim 17, wherein establishing the first and second desired pressures comprises making the first pressure greater than the second pressure.

19. The method of claim 15, wherein the housing further comprises a retention ridge extending inward, wherein the plurality of positions are displaced from each other along an axis of the housing, wherein installing the inflator at the determined position within the housing comprises disposing the inflator such that the retention ridge grips the inflator to maintain the inflator generally coaxial with the housing.

20. The method of claim 15, wherein the inflator comprises an outlet orifice and the housing comprises a first end, a second end, and a curved wall extending between the first and second ends, the housing further comprising a first aperture defined by the first end, in communication with the first chamber, and a second aperture formed in the curved wall, in communication with the second chamber, wherein installing the inflator at the determined position within the housing comprises disposing the outlet orifice generally between the first and second apertures.

21. A method for assembling an airbag module for protecting an occupant of a vehicle from impact, the airbag module comprising a cushion, an inflator, and a housing, the cushion comprising an outer wall and a divider that defines a first chamber and a second chamber within the cushion and an opening formed in the outer wall in communication with the second chamber, the cushion having a mounting region that traverses the divider, the divider comprising an end adjoining the mounting region, the end having an insertion surface and a resting surface, the method comprising:
    inserting the inflator into the housing;
    inserting the housing and the inflator into the mounting region such that the housing is in contact with the outer wall and the insertion surface; and
    rotating the housing and the inflator into alignment with the mounting region such that the housing is in contact with the outer wall and the resting surface to substantially prevent gas flow between the first and second chambers, outside the housing.

22. The method of claim 21, wherein the housing comprises a first aperture and a second aperture, wherein inserting the housing and the inflator into the mounting region comprises disposing the first aperture within the first chamber and disposing the second aperture in the second chamber.

23. The method of claim 21, wherein the airbag module is a side airbag module to be installed in a seat occupied by the occupant, wherein the housing comprises a mounting feature disposed to facilitate attachment of the housing to the seat, the method further comprising folding the cushion over the mounting feature to prevent gas from escaping the cushion via the opening.

* * * * *